US008214863B2

(12) United States Patent
Kim et al.

(10) Patent No.: US 8,214,863 B2
(45) Date of Patent: Jul. 3, 2012

(54) METHOD AND SYSTEM FOR CONTROLLING PERIPHERAL DEVICES CONNECTED TO A VIDEO DEVICE

(75) Inventors: Yong-jun Kim, Yongin-si (KR);
Jae-kwon Kim, Suwon-si (KR);
Hyo-dae Kim, Suwon-si (KR);
Yu-seong Jeon, Suwon-si (KR);
Jong-wook Park, Seoul (KR); Eu-gene Choi, Seoul (KR); Sung-hee Kim, Seoul (KR); Young-mi Kang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1166 days.

(21) Appl. No.: 10/913,468

(22) Filed: Aug. 9, 2004

(65) Prior Publication Data

US 2005/0034160 A1     Feb. 10, 2005

(30) Foreign Application Priority Data

Aug. 9, 2003   (KR) .................. 10-2003-0055230

(51) Int. Cl.
*H04N 7/18* (2006.01)
(52) U.S. Cl. ........... 725/74; 725/145; 725/147; 725/222
(58) Field of Classification Search .............. 725/74, 725/80, 147, 149, 145, 222; 370/222
See application file for complete search history.

(56) References Cited

U.S. PATENT DOCUMENTS

| 5,715,475 | A | 2/1998 | Munson et al. |
| 5,784,648 | A | 7/1998 | Duckwall |
| 6,286,071 | B1 * | 9/2001 | Iijima ........................ 710/124 |
| 6,452,935 | B1 | 9/2002 | Gibbs |
| 6,985,461 | B2 * | 1/2006 | Singh ........................ 370/329 |
| 7,178,157 | B1 * | 2/2007 | Kimura et al. ............. 725/38 |
| 2001/0018768 | A1 * | 8/2001 | Horiguchi et al. ......... 725/80 |
| 2002/0087688 | A1 * | 7/2002 | Kamentsky et al. ...... 709/225 |
| 2002/0131511 | A1 * | 9/2002 | Zenoni .................. 375/240.28 |

(Continued)

FOREIGN PATENT DOCUMENTS

DE     299 07 265 U1     10/1999

(Continued)

OTHER PUBLICATIONS

Lowndes M: "Design a Simple Dual-UART-Based Network", EDN Electrical Design News, Cahners Publishing Co. Newton, Massachusetts, US, vol. 30, No. 13, Jun. 13, 1985, pp. 163-167, 169, XP000945140.

*Primary Examiner* — Joseph P Hirl
*Assistant Examiner* — Jivka Rabovianski
(74) *Attorney, Agent, or Firm* — Sughrue Mion, PLLC

(57) ABSTRACT

A method and apparatus for effectively performing optimal connection configuration by recognizing the connection status between a video device and external peripheral devices. The method for identifying predetermined peripheral devices connected to a video device over serial communication control lines, includes, transmitting a command to establish connection of a current peripheral device having no given device ID to its upper peripheral device among the predetermined peripheral devices, and transmitting a command to disconnect a connection to its lower peripheral device; requesting unique device identification information to the predetermined peripheral devices; receiving a response to the request from the current peripheral device; and giving a device ID to the current peripheral device.

8 Claims, 17 Drawing Sheets

U.S. PATENT DOCUMENTS

| | | |
|---|---|---|
| 2003/0140352 A1 | 7/2003 | Kim |
| 2004/0098751 A1 * | 5/2004 | Konda et al. ............ 725/127 |
| 2004/0240838 A1 * | 12/2004 | Yanagida ................ 386/46 |

FOREIGN PATENT DOCUMENTS

| | | |
|---|---|---|
| DE | 100 60 666 A1 | 8/2001 |
| EP | 0 807 880 A1 | 11/1997 |
| EP | 0 841 776 A1 | 5/1998 |
| EP | 0 929 170 A2 | 7/1999 |
| EP | 1 253 748 A2 | 10/2002 |
| JP | 8-18813 A | 1/1996 |
| KR | 1997-0025012 A | 5/1997 |
| KR | 1997-0048116 U | 7/1997 |
| KR | 1998-078490 A | 11/1998 |
| KR | 2001-0054612 A | 7/2001 |

* cited by examiner

FIG. 6A

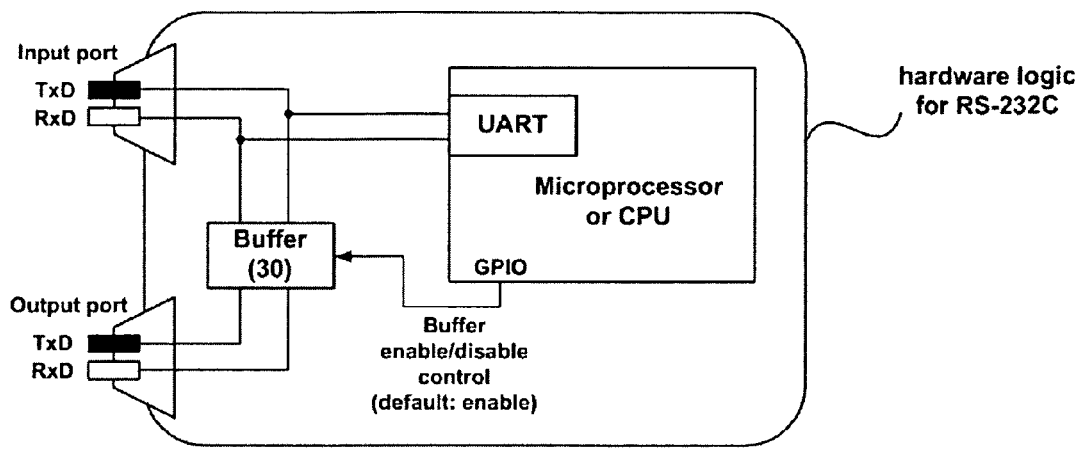

```
DescoveryAddressDevice()
{
  MessageFromDevice=TRUE;
  Broadcast to all device to disable the control buffer and clear all device ID
  While(MessageFromDevice==FALSE)do
  {
        Send WhoAreYou Packet to device          (A)
        if(Receive WhoIAm Packet)          (B)
        {
                Generate new device ID and send it to device
                Register the device ID
                (The device will enable the buffer)
        }
        else
        {
                MessageFromDevice=FALSE
        }
  }
}
```

FIG. 6B

```
UpdateDeviceStatus()
{
    for(id=id_start id < id_end; id++)
    {
            //query device status and store the return value
            DeviceStatus = QueryDeviceStatus(id);
            //IF there is no return value, DeviceStatus is NULL
            If(DeviceStatus == NULL)
            {
                    remove the device ID
            }
            else
            {
                    //update the device status information
                    Device[id].Status = DeviceStatus;
            }
    }
}
```

FIG. 7

| When image transmission possible | When Image transfer is impossible |
|---|---|
| Whether back panel image exists or not : yes | Whether back panel image exists or not : no |
| Back panel image | The number of the component input/output terminal |
| Back panel image information (type, color, width, height) | Type of component input/output terminal (DTV/DVD/···) |
| The number of the component input/output terminal | The number of the external input/output terminal |
| Type of component input/output terminal (DTV/DVD/···) | Type of the external input/output terminal (Monitor/VCR/···) |
| Central coordinates on image in each of component input/output terminal (Y/Pb/Pr, L/R) | The number of S-video input/output terminal |
| The number of the external input/output terminal | Type of S-video input/output terminal (DVD/VCR/..) |
| Type of the external input/output terminal (monitor/VCR/···) | The number of antenna input/output terminal |
| Central coordinates on image in each of external input/output terminal (R/G/B, L/R) | Type of antenna input/output terminal (coaxial/···) |
| The number of S-video input/output terminal | The number of digital audio input/output terminal |
| Type of S-video input/output terminal (DVD/VCR/···) | Type of digital audio input/output terminal (DVD/SAT/···) |
| Central coordinates on image in each of S-video input/output terminal | The number of external amplifier output terminal |
| External Input/output terminal number of audio connected to S-video input/output terminal | Type of external amplifier output terminal (FL/FR/···) |
| The number of antenna input/output terminal | The number of subwoofer output terminal |
| Type of antenna input/output terminal (coaxial/···) | ... |
| Central coordinates on image in each of antenna input/output terminal | |
| The number of digital audio input/output terminal | |
| Type of digital audio input/output terminal (DVD/SAT/···) | |
| Central coordinates on image in each of digital audio input/output terminal | |
| The number of external amplifier output terminal | |
| Type of external amplifier output terminal (FL/FR/···) | |
| Central coordinates on image in each of external amplifier output terminal(L/R) | |
| The number of subwoofer output terminal | |
| Central coordinates on image in each of subwoofer output terminal | |
| ... | |

METHOD AND SYSTEM FOR CONTROLLING PERIPHERAL DEVICES CONNECTED TO A VIDEO DEVICE

BACKGROUND OF THE INVENTION

This application claims the priority of Korean Patent Application No. 10-2003-0055230 filed on Aug. 9, 2003, in the Korean Intellectual Property Office, the disclosure of which is incorporated herein in its entirety by reference.

1. Field of Invention

The present invention relates to a method for guiding connection between a video device (e.g., TV) and external peripheral devices (e.g., AV devices such as an AV receiver, a digital versatile disc (DVD) player, a DVD recorder, a DVD Combo, a video cassette recorder (VCR), a cable set-top box, a satellite set-top box and a ground wave set-top box) through a screen so that a user can easily make the connection between the devices. More particularly, the present invention relates to a method and apparatus for effectively performing optimal connection configuration by recognizing the connection status between a video device and external peripheral devices.

2. Description of the Related Art

According to conventional methods, a TV and AV devices are connected through AV cables to transmit and receive video signals and audio signals, as shown in FIG. 1. For such connection, a user refers to the user's manuals of the respective AV devices to make connection therebetween through the AV cables. When the connection through the AV cables is completed, confirmation is made as to whether the functions of the AV devices are normally performed after the TV and the relevant AV devices are powered on. At this time, a method for confirming these functions involves switching to an external input to which a relevant AV device is connected and then to check whether a picture is normally displayed on the screen of the TV. If the picture is not displayed normally, the user should solve this problem by referring again to the user's manual of the relevant AV device or by receiving the assistance of other people.

For such a method, it is not easy for a general user having no knowledge of AV devices to correctly connect the AV devices without trial and error because the user must determine the methods for connecting the AV devices by himself/herself. Further, as the number of methods for making connection between a video device and peripheral devices increases with the development of new technologies, it is becoming more difficult for a user to recognize which connection method among a number of possible connection methods will establish optimal connection configuration. For example, if an AV device is a DVD player, a component terminal for video is connected to a TV to obtain the highest clear image quality, and a digital audio output for audio is connected to the TV to obtain the best audio. However, a general user may not know such a fact and attempt to connect a normal AV output to the TV to view video.

As described above, a general user having no knowledge on the functionality and properties of AV devices may undergo this trial and error process several times to connect the AV devices to a TV. Further, since it is difficult to confirm whether the connection is normally established before actually using the AV devices, considerable time and effort is needed.

Thus, there is a need for a method for informing a user of the optimal connection configuration by referring to information about respective AV devices upon connecting the respective AV devices to a TV.

SUMMARY OF THE INVENTION

Illustrative, non-limiting embodiments of the present invention overcome the above disadvantages, and other disadvantages not described above.

A method consistent with the present invention provides a process for automatically receiving device information from external peripheral devices connected to a video device and computing optimal connection configuration between the video device and the external peripheral devices.

Further, a method consistent with the present invention provides a process for suggesting optimal connection status when the current connection status is not optimal by checking the current connection status between a video device and external peripheral devices.

Still further, a method consistent with the present invention provides guidance by which a user can follow configuration for AV cable connection while viewing the screen of a video device.

According to an aspect of the present invention, there is provided a method for intelligently configuring connection between a video device and peripheral devices, comprising a first step of sensing peripheral devices connected to a network and giving a unique identifier to each of the connected peripheral devices; a second step of requesting back panel information to the peripheral devices and receiving back panel information from the peripheral devices; a third step of computing optimal connection configuration between the video device and the peripheral device based on the back panel information; and a fourth step of checking whether the video device and the peripheral devices are connected to each other in conformity with the optimal connection configuration.

According to another aspect of the present invention, there is provided a system comprising a video device and at least one peripheral device. The video device comprises a packet generating unit for searching for the peripheral device, inquiring back panel information, and producing a data packet conforming to a protocol for checking connection status; a memory for storing connection status information indicating the connection status with the peripheral device; a graphic generating unit for graphically producing connection status between the devices using the back panel information received from the peripheral device; and a control unit for sensing the connected peripheral device using the data packet, requesting the back panel information of the peripheral device to compute optimal connection configuration, and determining whether the current connection status is optimal based on the computed results. The peripheral device comprises a transceiver unit for transmitting and receiving data to and from the video device through network connection; a packet generating unit for producing a response packet to the request packet of the video device; a memory for storing the back panel information of the peripheral device; and a control unit for checking the back panel information and checking a connection signal with the video device.

BRIEF DESCRIPTION OF THE DRAWINGS

The above and other objects and features of the present invention will become apparent from the following description of exemplary embodiments of the present invention given in conjunction with the accompanying drawings, in which:

FIG. 6A is a diagram explaining a scheme for automatically giving IDs to external AV devices;

FIG. 6B is a diagram checking whether external AV devices on a network are deleted in the scheme for automatically giving IDs to the external AV devices;

FIG. 7 is a table for explaining an example of back panel information;

DETAILED DESCRIPTION OF THE INVENTION

Hereinafter, exemplary embodiments of the present invention will be described in detail with reference to the accompanying drawings.

Figure 1:
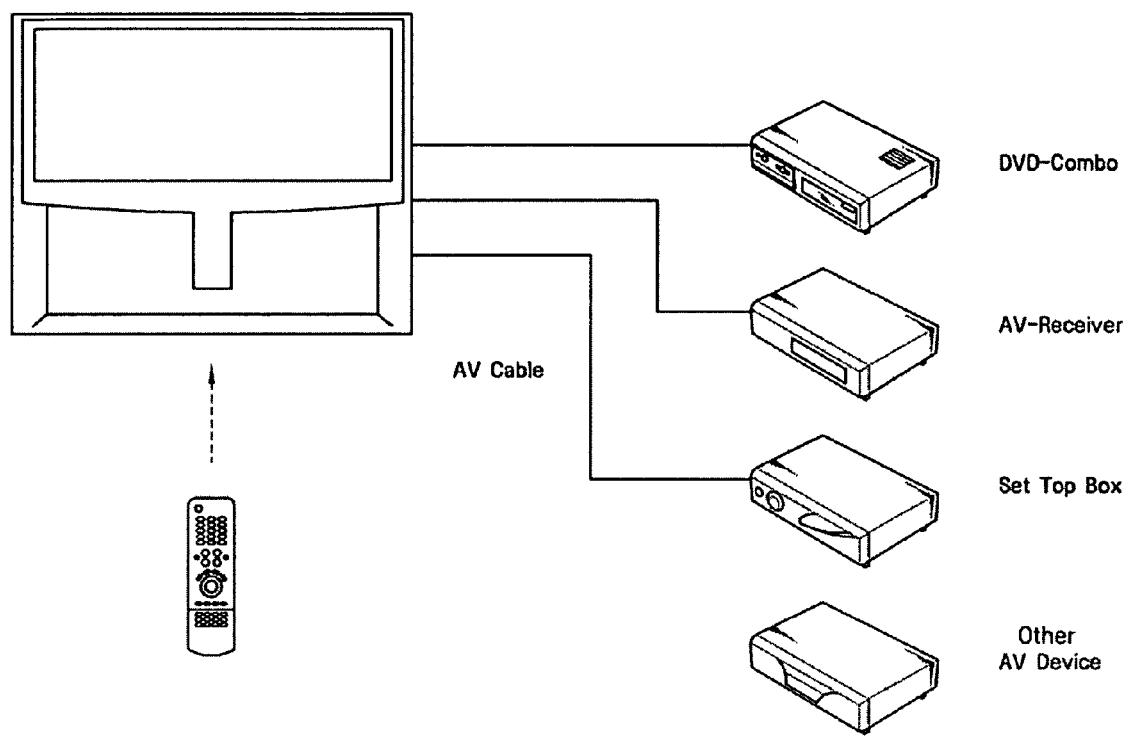
FIG. 1 is a diagram illustrating a configuration of an existing system.
Figure 2:
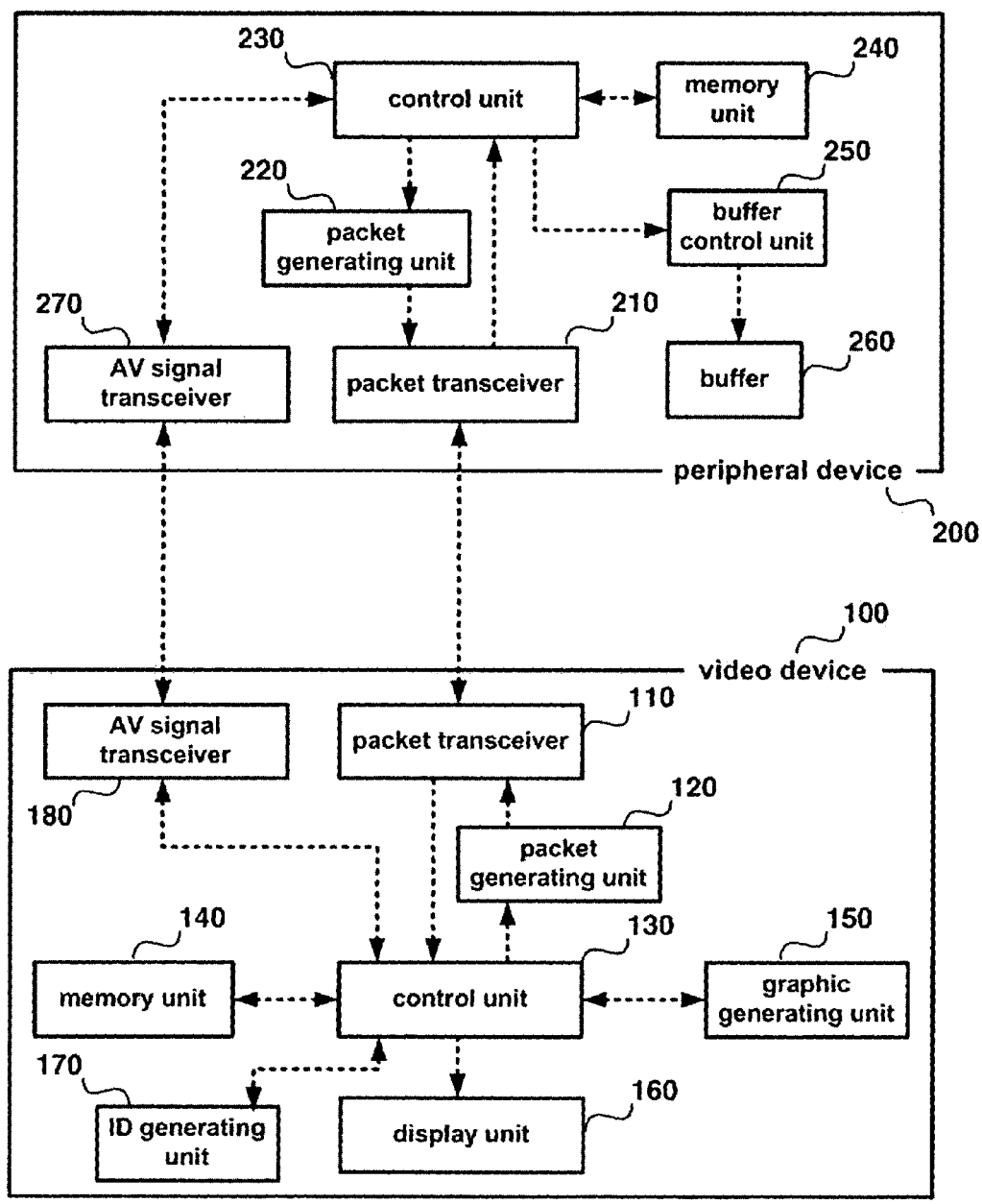
FIG. 2 is a block diagram showing an apparatus according to the present invention in a state where the apparatus is divided into a video device side and a peripheral device side for the purpose of illustration.

FIG. 2 is a block diagram showing an apparatus according to the present invention in a state where the apparatus is divided into a video device side and a peripheral device side for the purpose of illustration. According to the present invention, a video device 100 such as TV includes a transceiver unit 110 for transmitting and receiving data to and from a peripheral device such as an AV device over a network connection using a RS-232C cable or the like; a packet generating unit 120 for searching for a peripheral device 200, inquiring back panel information of the peripheral device, and creating a data packet conforming to a protocol for checking connection status; a memory 140 for storing connection status information indicating the connection status with the peripheral device 200; a graphics generating unit 150 for producing a graphic indicating the connection status between the devices using the back panel information received from the peripheral device 200; a control unit 130 for sensing the connected peripheral device 200 using the data packet, requesting back panel information of the peripheral device, computing optimal connection configuration, and determining whether the current connection status is optimal; and an ID generating unit 170 for producing and giving a unique device ID for each peripheral device.

An AV signal transceiver 180 transmits analog signals for video or sound to the slave device, and receives the signals from the slave device through an AV cable according to a control command generated in the packet generating unit 120. For example, the signals inputted from the AV signal transceiver 180 comprises a YPbPr video signal inputted from a component terminal, an S-video signal inputted from an S-video terminal, a sound signal inputted from a digital audio terminal, or a sound signal inputted from an analog audio terminal whereas the signals outputted from the AV signal transceiver 180 comprise a video signal outputted from a TV or a sound signal outputted from a TV.

Meanwhile, the peripheral device 200 includes a transceiver unit 210 for transmitting and receiving data to and from the video device 100 over the network connection using a RS-232C cable or the like, a packet generating unit 220 for receiving a request packet from the video device and producing a data packet responsive to it, a memory 240 for storing back panel information and back panel images, a control unit 230 for checking the back panel information and checking a connection signal with the video device, and AV signal transceiver 270 for transmitting AV signals to the AV signal transceiver 180 and receiving AV signals from the AV signal transceiver 180.

The peripheral device 200 further includes a buffer 260 for determining whether the video device 100 or its upper peripheral device is connected to its lower peripheral device, and a buffer control unit 250 for disconnecting and connecting the buffer 260 according to packets, namely, various control commands received from the video device 100.

Figure 3A:
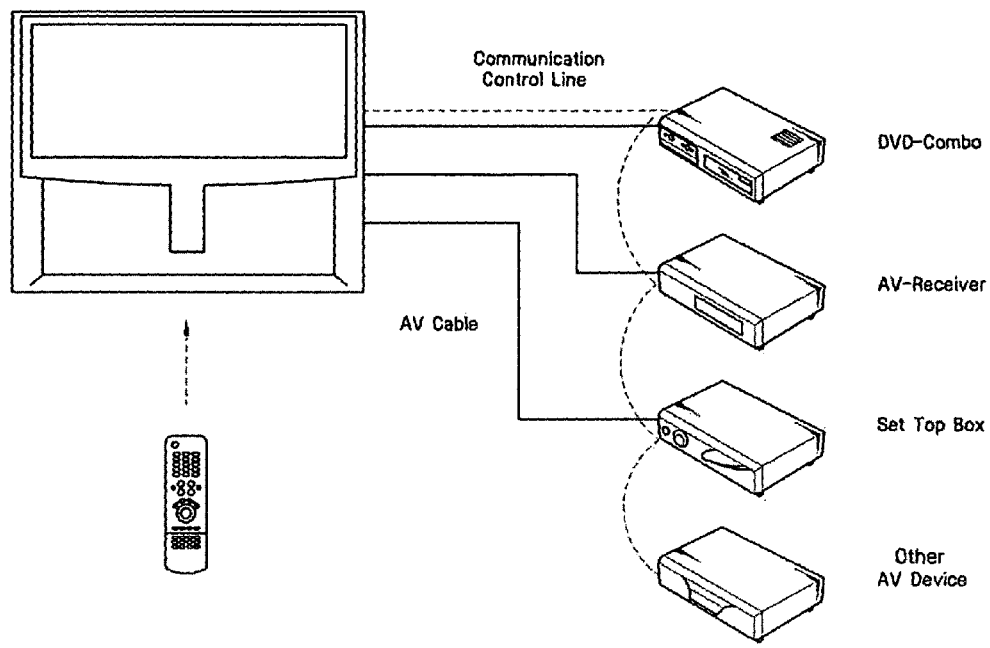
FIG. 3A is a diagram illustrating a connection configuration of a system according to the present invention.

The present invention, as shown in FIG. 3A, comprises AV cables (indicated by solid lines) transmitting and receiving video or audio signals as well as communication control lines (indicated by dotted lines) using a separate protocol to transmit data packets, for example, IEEE 1394 connection lines, RS-232C cables, or the like. Over the control lines, device information, connection status information and the like of the AV devices may be transmitted and received and operation commands that can control the devices may be delivered.

Figure 3B:
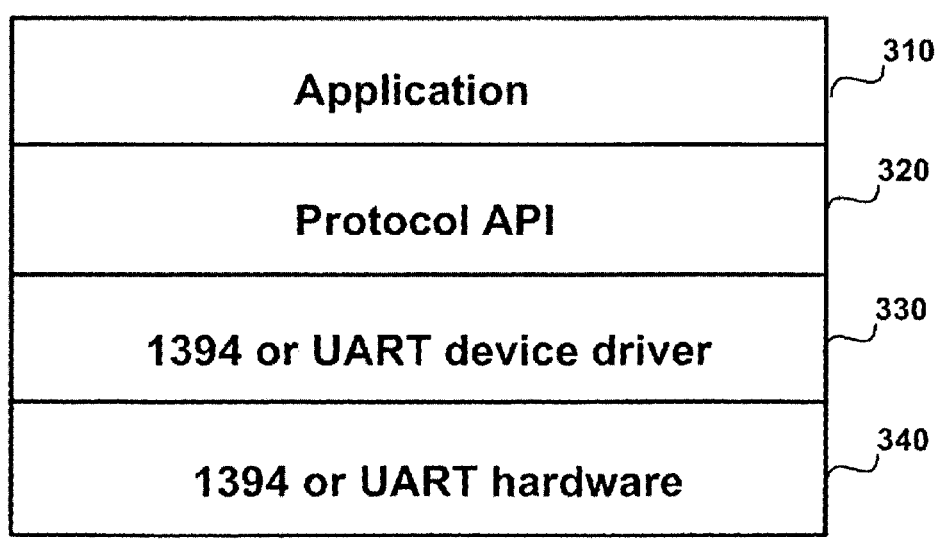
FIG. 3B is a diagram illustrating a layer structure of software and hardware for implementing IEEE 1394 and RS-232C schemes.

FIG. 3B illustrates a layer structure of software and hardware for implementing the aforementioned IEEE 1394 and RS-232C schemes. First, an uppermost application 310 is present, which is an application program, and then a protocol application program interface (API) 320, which is a middleware serving as a protocol being a communication language between devices, is present between the application 310 and a device driver 330. Beneath the protocol API, the device driver 330 is present to drive devices such as 1394, a universal asynchronous receiver/transmitter (UART) or the like. At a bottom position, a physical layer 340, namely, a 1394 port or UART hardware is present. It will be readily apparent to those skilled in the art that the present invention may be implemented by using a variety of physical layers such as a scheme using Ethernet, a scheme using power line communication (PLC), or the like, in addition to the aforementioned IEEE 1394 and RS-232C schemes.

Figure 3C:
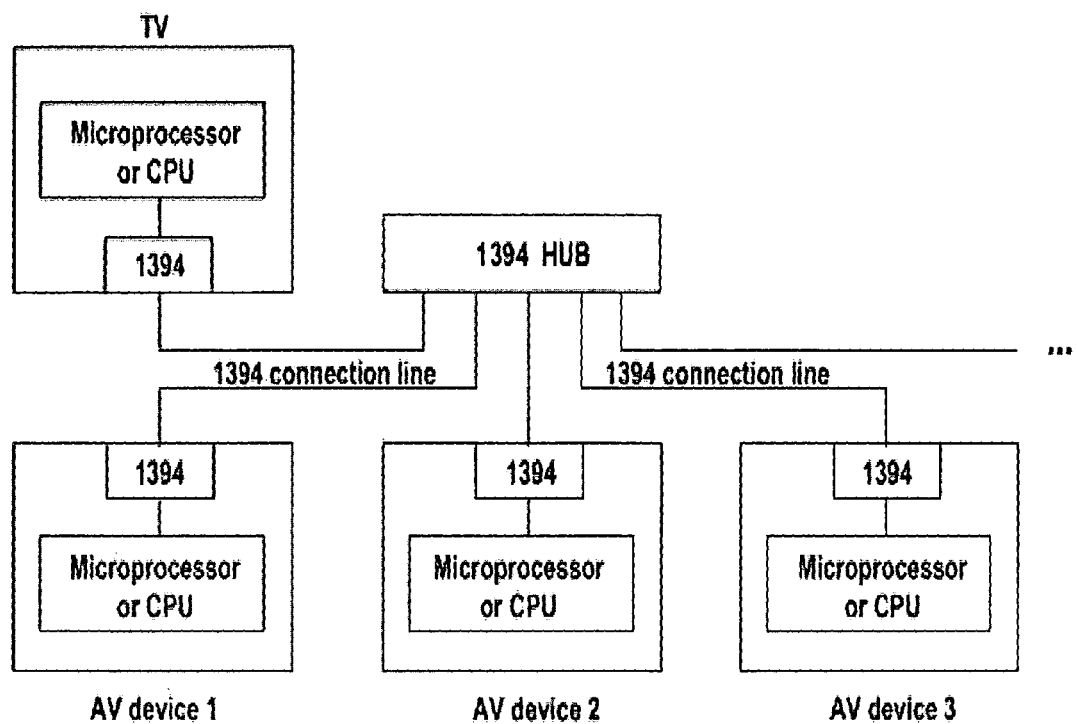
FIG. 3C is a block diagram illustrating a TV and AV devices connected to one another through 1394 connection lines using a hub.
Figure 3D:
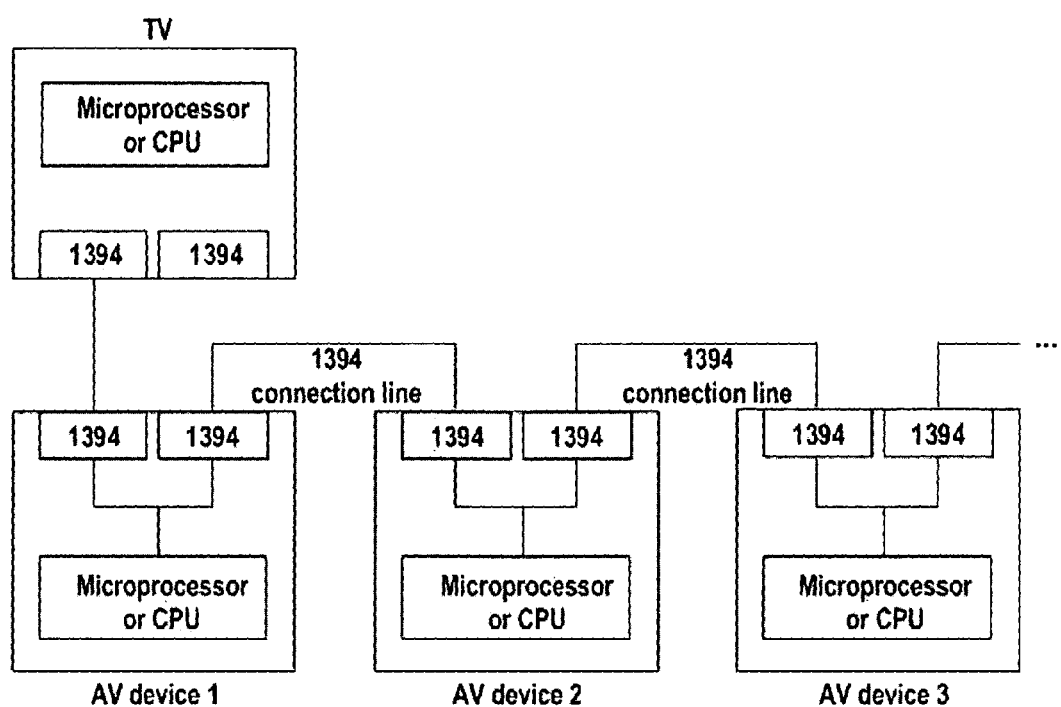
FIG. 3D is a block diagram illustrating a TV and AV devices connected to one another in a daisy-chain scheme that does not use a hub, using IEEE 1394.

FIG. 3C is a block diagram illustrating a TV and AV devices connected to one another through 1394 connection lines using a hub, and FIG. 3D is a block diagram illustrating a TV and AV devices connected to one another in a daisy-chain scheme that does not use a hub. In FIG. 3C, the TV and other devices are all connected to the 1394 hub over 1394 connection lines. In this case, each device has a unique device ID, namely, a global unique ID (GUID) through a mechanism conforming to the IEEE 1394 standard, but the given ID is reset and configured back when a device is added or deleted. The microprocessors as shown are central processing modules embedded in home electronics devices or the like and perform the same role as a CPU. There may be a scheme for using connection lines of the IEEE 1394 scheme but connecting between the TV and the respective AV devices in the daisy-chain scheme without using the hub, as shown in FIG. 3D. This scheme is a scheme in which a 1394 port of the TV is connected to a first 1394 port of a first device, and a second 1394 port of the TV is connected to a first 1394 port of a second device.

Figure 3E:
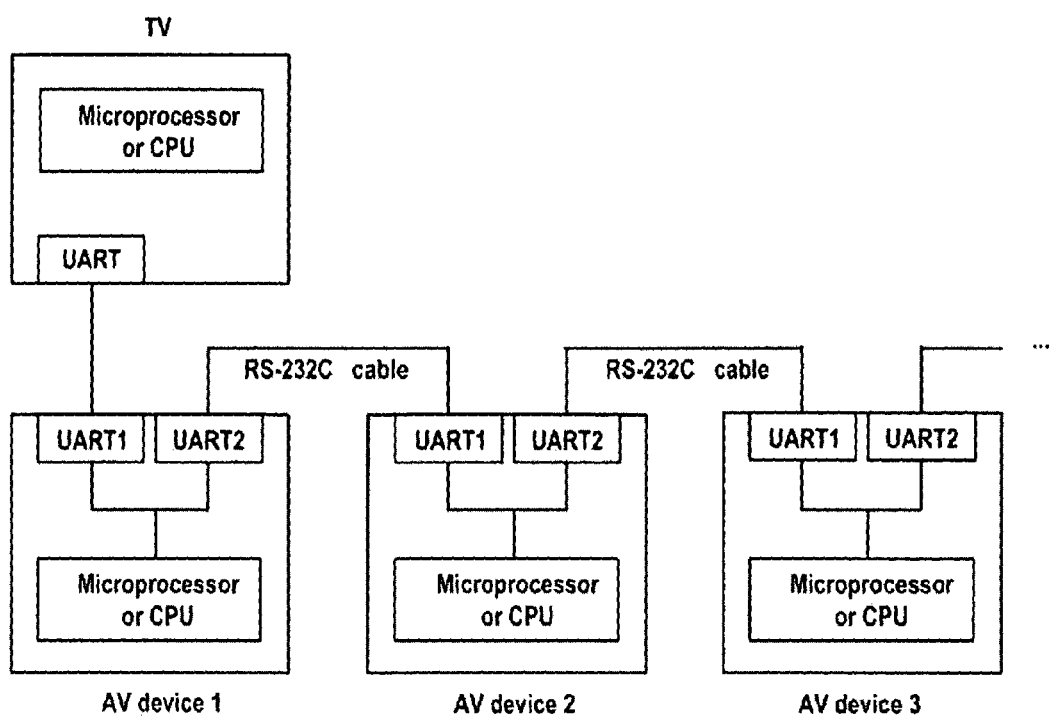
FIG. 3E is a block diagram illustrating a TV and AV devices connected to one another in a daisy-chain scheme, using RS-232C (Recommended Standard 232 Revision C) cables.

FIG. 3E is a block diagram illustrating a TV and AV devices connected to one another in a daisy-chain scheme, using RS-232C (Recommended Standard 232 Revision C) cables. This scheme is a scheme in which a universal asynchronous receiver/transmitter (UART) of the TV is connected to a UART1 of a first device, the UART1 is in turn connected to a UART2 of the first device, and the UART2 is in turn connected to a UART1 of a second device. As such, the communication control line using the RS-232C cable is a serial connection scheme in which the TV and the first device are connected to each other using the UART port and, likewise, the first device and the second device are connected to each other using the UART port. A buffer is connected between the UART2 port of the first device and the UART1 of the second device, and is disabled or enabled according to control commands from the TV as a master. If the allocation of IDs to a number of external devices is desired, the TV as a master transmits to a number of external devices a control command to disable buffers of the external devices, and the devices other than the first device are disabled. Thus, the TV gives an ID in communication with the first device, and transmits a control command to enable the buffer between the first device and the second device. If the buffer is enabled according to the control command from the TV, the TV allocates an ID in communication with the second device. In the case of giving GUID to an AV device using a RS-232C cable as described above, the given ID need not be reset even when a device is added or deleted. The process of allocating the ID will be described in detail upon discussing FIGS. 6A and 6B.

Figure 4A:
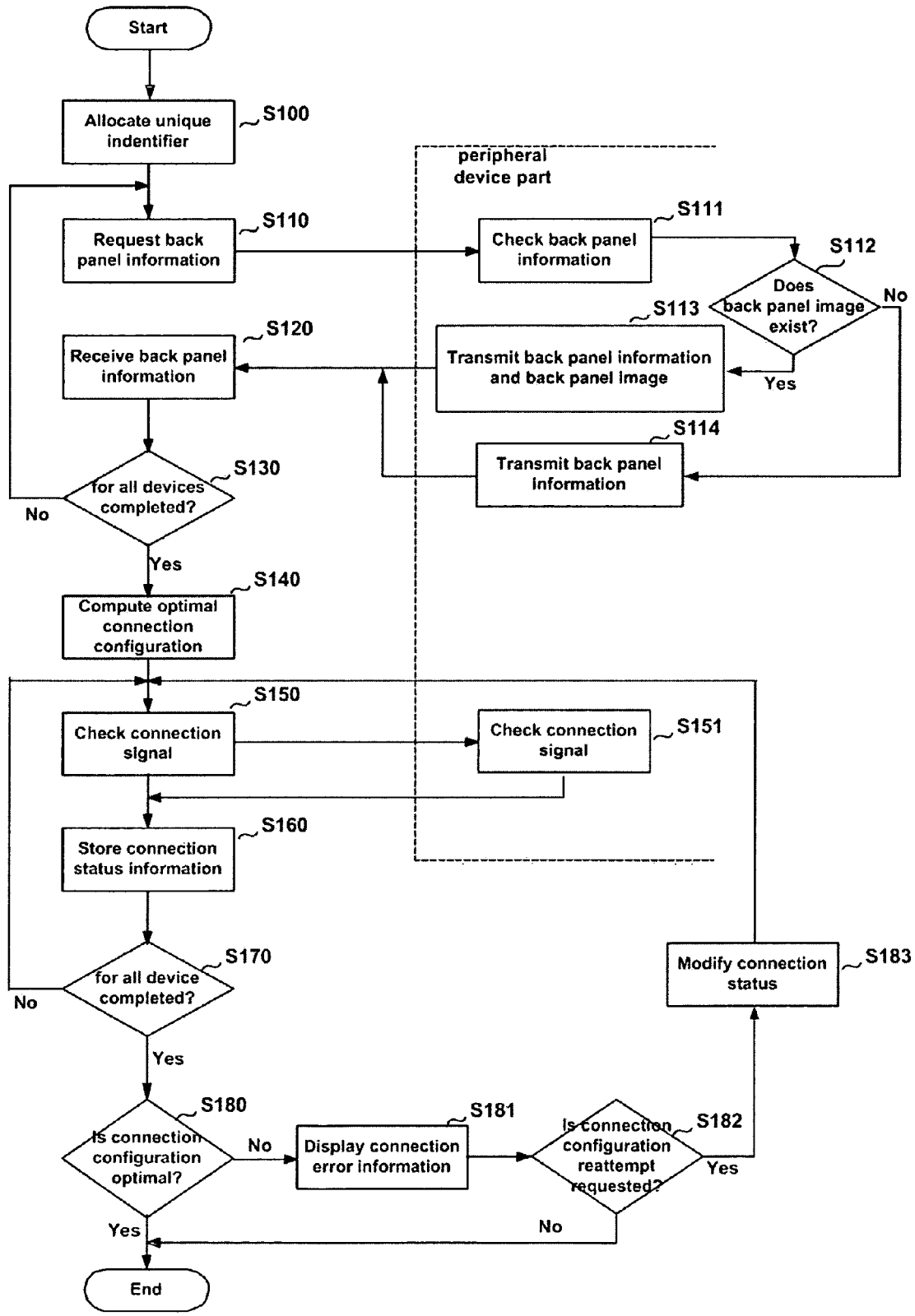
FIG. 4A is a flowchart generally showing a method for configuring device connection according to the present invention.

FIG. 4A is a flowchart generally showing a method for configuring device connection between a TV and AV devices according to the present invention.

First, if a user connects the TV and the AV devices to the network using communication control lines such as RS-232C cables or the like, the TV senses the AV devices connected to the network and allocates a unique identifier to each of the respective devices (S100). This process will be described in detail upon discussing FIGS. 6A and 6B. Next, the TV sends a command to request the back panel information to the AV devices each having the given unique identifier over the communication control line, such as a RS-232C cable or the like, using a promised protocol according to the user's input (S110). If the AV devices receiving the back panel information request command check their own back panel information (S111) and send their back panel information to the TV using the promised protocol via the communication control lines, such as the RS-232C cables or the like (S114), the TV receives the back panel information (S120).

If the AV device has its back panel image (S112), the AV device sends the back panel information along with the back panel image (S113). The detailed example regarding the back panel information will be described upon discussing on FIG. 7.

The process from S110 to S120 is repeated until the TV obtains back panel information for all of the AV devices connected to the network (S130).

The TV derives an optimal connection configuration method over the current network by referring to the back panel information of the respective AV devices (S140). At this time, the optimal connection configuration refers to a configuration for connecting the AV devices and the TV using AV cables so that the user can view and listen to the best quality video and audio possible. For example, it is preferable that a cable set-top box or a DVD player is connected to the component terminal of the TV while an AV receiver or a VCR is connected to the composite terminal of the TV. The details on the optimal connection configuration process will be given in discussion of FIG. 8 below. The TV checks the current connection situation according to the derived optimal connection configuration method (S150 and S151), and stores information on the checked connection status (S160). The connection situation check is performed on the connected AV device basis and proceeds in sequence until the devices are all checked (S170).

Figure 4B:
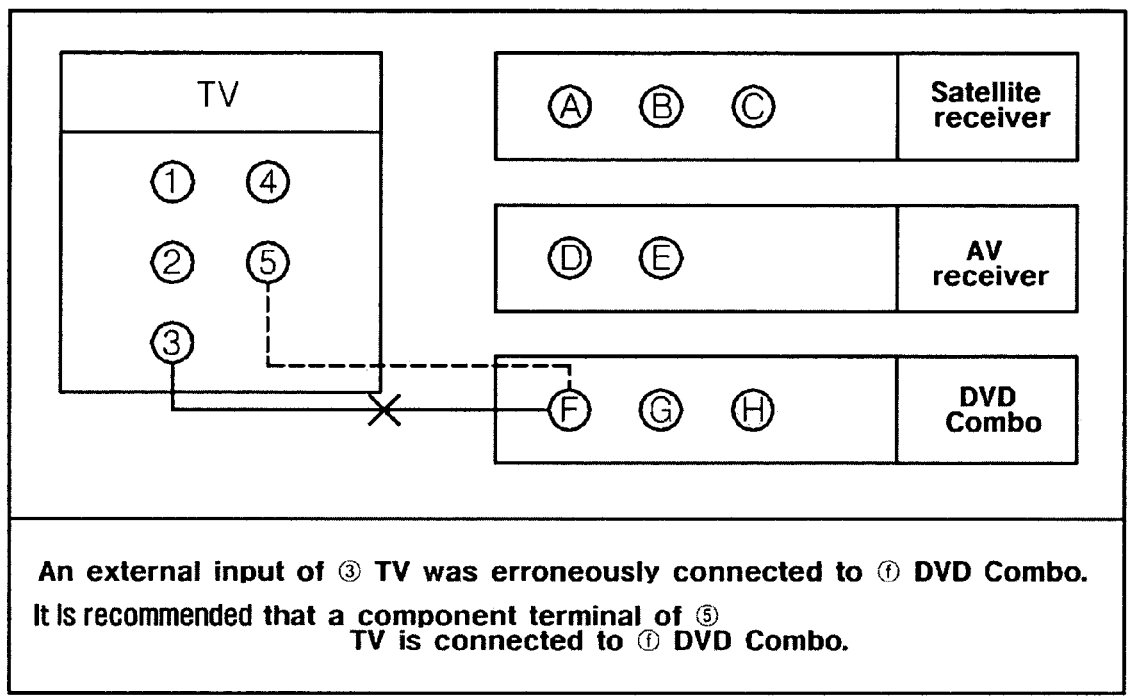
FIG. 4B is a diagram illustrating an example of a configuration error screen.

If an optimal connection is established (S180), the user is notified that the correct connection is configured and the process is normally ended. If the correct connection is failed (S180), a connection configuration error screen is displayed to the user (S181). FIG. 4B illustrates an example of the configuration error screen. If such an error exists, it is notified through the screen or the sound that the terminal connection between specific numbers is incorrect, and the correct connection method is suggested on the screen. If the video or audio is not output because of an incorrect connection configuration, the user should directly correct such an error as described above.

Meanwhile, even though the connection configuration is not optimal but video and the audio are output (for example, the DVD player is connected to the composite terminal of the TV), it is first displayed on the screen that there is an error. However, since in this case the user may not want to change the configuration, a chance is given to the user to allow the user to determine whether to re-attempt the connection configuration (S182). If the user determines to re-attempt the connection configuration, the steps from S150 are again performed according to the connection configuration modified by the user (S183), otherwise the process is ended. A process in which the user modifies the connection status will be discussed. The user connects AV devices to the TV on a step-by-step basis according to the connection error information and the correct connection configuration guide displayed on the screen and then performs the steps from S150 again, and thus is allowed to check the connected result. At this time, if the user couples AV lines in conformity to the connection configuration upon coupling AV cables, it is notified to the user that the cables are being correctly coupled, by outputting sounds and displaying flickering effects on the screen each time the AV line is coupled.

A case where a TV and a DVD player are present in the system of the present invention will be described by way of example based on the operation sequence of FIG. 4A. First, the user connects the TV to the DVD player using the communication control line, such as an RS-232C cable or the like. In response thereto, the TV senses the existence of the DVD player by communicating with the DVD player connected to the network over the control line (S100). Next, the user clicks a particular button on the remote control to cause the TV to perform connection configuration to the DVD player. The TV displays a guide screen on its screen.

The TV transmits a back panel information request command to the DVD player using a promised protocol (S110). The DVD player checks the back panel information according to the command transmitted from the TV (S111) and sends its back panel information to the TV using a promised protocol in response to the transmission request (S114). At this time, the back panel information includes one component output terminal, one external input terminal, one external output (monitor output) terminal, one digital audio (optical) output, one antenna input, and one antenna output.

The TV determines that the current optimal connection method for connecting the DVD player over the network is to employ the component output terminal and the digital audio output terminal, by referring to the back panel information received from the DVD player (S140).

The TV checks the current connection situation according to the derived connection configuration method (S150). That is, the TV checks whether an AV line is coupled from the DVD player to one of the TV's component inputs and a signal is incoming over the AV line.

Further, the TV checks whether a digital audio from the DVD player is output at the digital audio (optical) input terminal.

Since a user did not yet couple the AV line, the check result is displayed as an error due to non-connection (S181). The user couples the AV line according to a connecting method displayed on the screen, namely, to a guide screen to couple the component input terminal of the TV to the component output terminal of the DVD player (S183). At this time, if the component input terminal of the TV and the component output terminal of the DVD player are correctly connected to each other, the TV outputs a sound to notify that the correct configuration has been made. Next, the user connects the digital audio input terminal of the TV and the digital audio output terminal of the DVD player using a digital audio line.

The user clicks a reset button displayed on the screen to allow the TV to check the connection configuration again. If it is checked that the optimal connection is established, the TV notifies to the user through the screen and sound that the normal connection has been established. Thus, it is possible to easily perform AV line connection on a step-by step basis since notification is provided through the sound output when the user correctly connects between respective input and output terminals of the AV devices.

In addition, it is possible to provide animation effects that cause lines connecting between the TV and the DVD player to move and flicker. Further, when color discrimination is required, lines, plugs attached to ends of the lines, or the like are marked with different colors so that further visual effects are provided.

Although the embodiment of the present invention has been described in connection with the TV as the TV, any TV may be applied only if the TV can display an image and has input and output terminals for connection to external AV devices. As an example, the TV may be an analog TV receiver, a digital TV receiver, a set-top box receiver, or the like.

Alternatively, a PC may be a TV and the TV may be an AV device.

Figure 5:
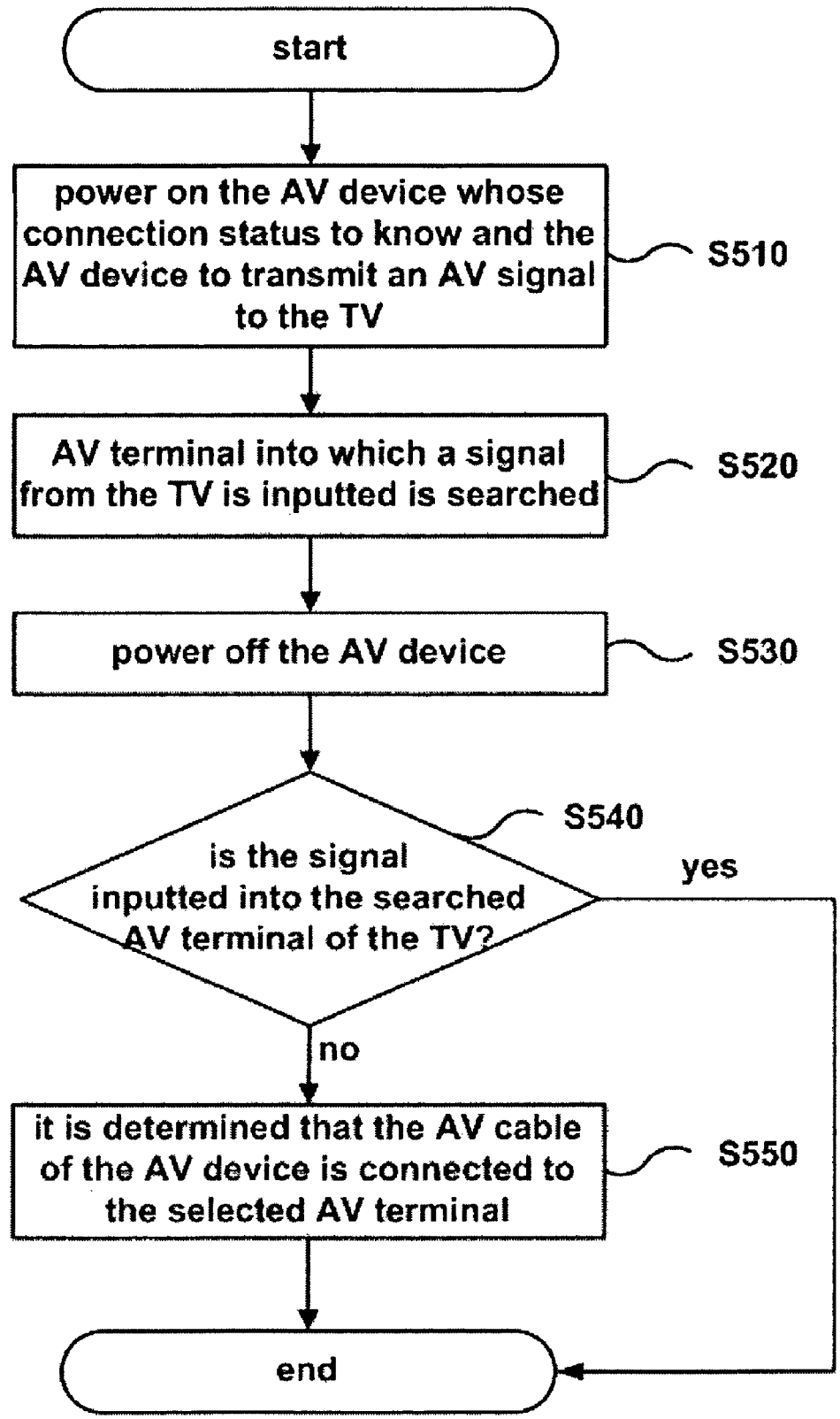
FIG. 5 is a flow chart illustrating a method to know to which AV device each of AV terminals connect.

FIG. 5 is a flow chart illustrating a method to know to which AV device each of AV terminals, which a TV has, is connected, wherein a method to locate into which terminal of the TV 100 the AV signal of a specific AV device 200 is flown. Actually, assuming that several AV devices 200 exist and they are connected to one another through several input terminals 200 of the TV 100 and several AV cables, there is a need to know into which input terminal of the TV 100 the specific AV device 200 flows the AV signal. However, when there are numerous AV devices and AV cables, it may be difficult and troublesome to identify manually to which AV device 200 the AV cable connected to the back panel of the TV 100.

Referring to FIG. 5, the TV 100 transmits a control signal to power on power supply to an AV device through a communication control line, thereby allowing the AV device whose connection status the TV desires to know to be powered on and the AV device to transmit an AV signal to the TV (S510). Then, an AV terminal into which a signal from the TV 100 is inputted is searched (S520). Searching for the AV terminal is conducted, into which terminal the signal is inputted by converting a video mode or a sound mode. For example, when the AV device whose connection status the TV desires to know refers to a device outputting an video signal, the TV finds out an input mode of the signal by changing various video modes such as a YPbPr video mode, an S-video mode, an external input video mode. Through this process, it can be searched into which terminal the video signal is inputted.

Then, power is turned off the AV device (S530) and it is determined whether the signal has been inputted into the searched AV terminal of the TV (S540). If a signal is inputted although the power supply to the AV device is powered off, the signal input in step S520 may be a signal from another device than the AV device. When the signal has not been inputted, it is determined that the AV cable of the AV device is connected to the selected AV terminal (S550).

FIG. 6A or 6B explains a process in which the TV gives a unique identifier to external AV devices that are connected to the network to identify the external AV devices. FIG. 6A is a diagram explaining a scheme for automatically giving the ID to the external AV devices and FIG. 6B is a diagram checking whether the external AV device over the network is deleted in the scheme for automatically giving IDs to the external AV devices. In order to automatically sense connection situation and dynamically update such situation information, it is necessary to automatically allocate IDs according to the current network situation formed by the TV and the external AV devices so that when there are overlapping devices they are recognized as different devices to allow a user to employ them separately.

In a network in which interlocking connections are made by TCP/IP, it can be solved using a scheme for dynamically giving a unique IP conforming to the network. Allocating a dynamic IP in the network using TCP/IP includes several known methods such as using a dynamic host configuration protocol (DHCP) server. However, serial communication such as RS-232C requires separate hardware logic for processing. This is because it is difficult to discriminate devices participating in the network only with a software algorithm.

First, a method for giving IDs using separate buffer control circuits in a serial communication scheme such as RS-232C among schemes of automatically giving IDs to external AV devices will be discussed. Here, a buffer control circuit is a circuit used to disconnect a lower network to allow only one device to communicate in giving an ID to the device. That is, the buffer control circuit causes a device in the network which desires to be allocated with its ID to disable the buffer 30 of the device so that the communication with a lower network is blocked and thus only the device can communicate with the TV to receive an ID.

Figure 10A:
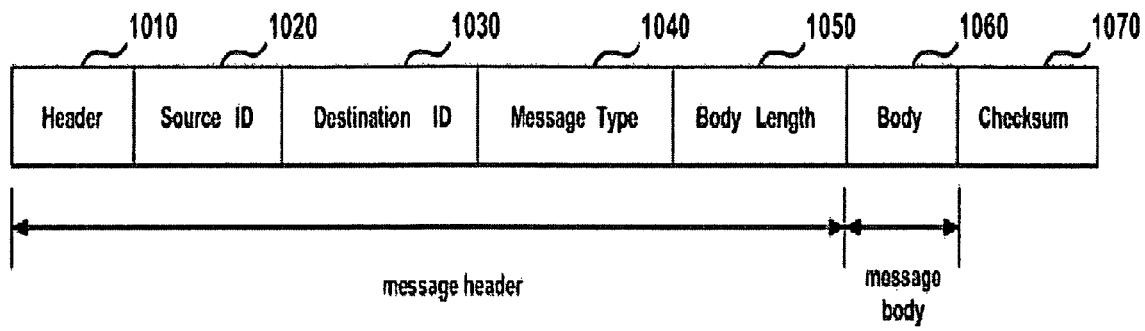
FIG. 10A is a diagram showing an entire structure of a transmission/reception packet.

The discussion proceeds with reference to the shown second program. If the TV sends to all external AV devices over the network a command to disable the buffer 30, only external AV devices directly connected to the TV are permitted to communicate. Such a command is in the form of a control signal conforming to a predetermined protocol, as shown in FIG. 10A, and is delivered over the serial communication control line.

In response thereto, the TV is in communication with a first external AV device and allocates an ID to the communicating external AV device. Then, the TV sends a command to enable the buffer 30 to the external AV device having the allocated ID, and in response to the command, the external AV device having the allocated ID enables its buffer 30 for the sake of an external AV device that will subsequently communicate. The enable command is also in the form of a control signal conforming to a predetermined protocol, as shown in FIG. 10A, and is delivered over the serial communication control line.

Accordingly, the TV is able to communicate with external AV devices having their IDs and external AV devices having no ID. The ID generating unit 170 in the TV produces a unique ID which does not overlap with existing allocated IDs and allocates the unique ID to the external AV device having no ID over the communication control line.

Then, the external AV device with a new allocated ID enables the buffer 30 for the sake of a subsequent external AV device. With this method, only a number of external AV devices having allocated IDs and one external AV device having no allocated ID are connected to the network.

Thereafter, there are no more external AV devices that do not have an allocated ID after the TV has allocated an ID to the last external AV device, and thereby a process in which the TV allocates IDs to external AV devices over the entire network is ended. Here, the TV sends a "Who Are You" (A) packet, namely, a packet to request unique device identification information to the external AV devices in order to find an external AV device having no allocated ID, and accordingly only an external AV device having no ID responds with a "Who I Am" (B) packet.

Meanwhile, the control device always should check whether an external AV device is added or deleted to or from the network. First, a method for determining whether an external AV device is deleted from the network will be described with reference to a third program of FIG. 6B. As shown, the RS-232C network is updated in its status by a user's request or by the need of the TV at the time when the network is used, in view of its property. At this time, status information of external AV devices which have been previously registered is reflected, and if there is no response from the external AV device, it is determined that the external AV device that does not respond has bee deleted from the network, and the relevant external AV device is deleted from the list.

Next, a method for determining whether a new external AV device is added in a network will be described. In the RS-232C network, the TV cannot automatically recognize whether a new device is added to the network. Thus, to recognize whether the new device has been added, it is required to ascertain whether there is an external AV device that does not have an allocated ID on the network. Here, because several external AV devices may be registered at one time, it is required to cause external AV devices having no ID to disable their buffer and external AV devices having an allocated ID to enable their buffer, such that external AV devices which have not been registered are registered one by one.

FIG. 7 is a table for explaining an example of back panel information. If the TV requests back panel information from an AV device, the AV device first reads its back panel information from the memory 240 and then if an additional back panel image is present, the AV device sends the back panel image along with the back panel information. If the additional back panel image is not present, the AV device simply sends only the back panel information to the TV. Examples of such back panel information are divided into a case where an image can be transmitted and a case where an image cannot be transmitted. If an image is present, the back panel information will additionally include center coordinates on an image for each input/output terminal. Although the TV can virtually create a back panel image for an AV device having only back panel information, the image may have a shape different from that of the real back panel. Thus, the TV can preferably configure a more accurate guide screen if the AV device stores its back panel image as an image file and then provides it to the TV.

Figure 8:
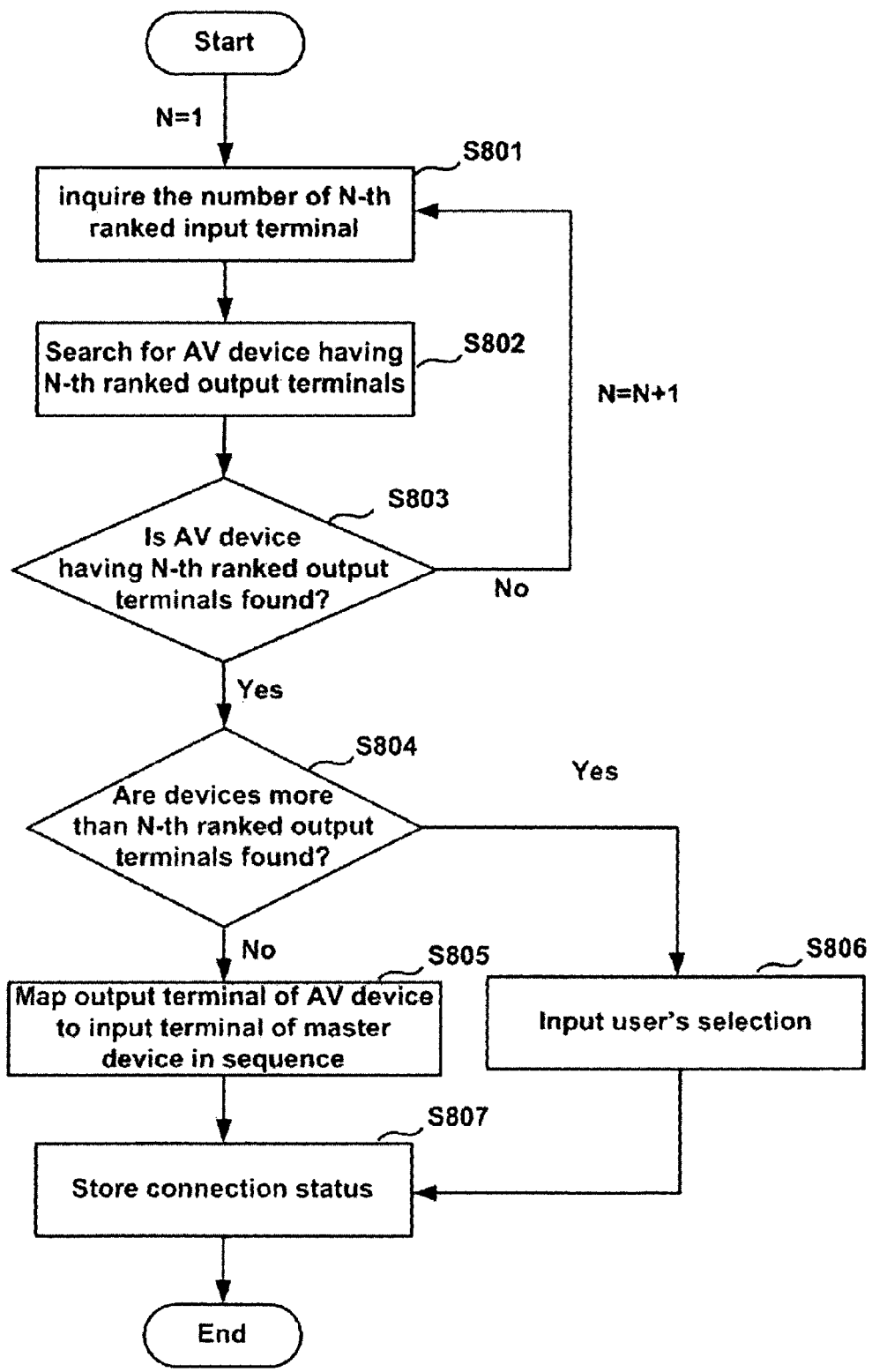
FIG. 8 is a flowchart specifically explaining the process of mapping video input terminals of a TV to video output terminals of an AV device in computing optimal connection configuration in step S140 of FIG. 4A.

FIG. 8 is a flowchart specifically explaining a process of mapping a video input terminal of a TV and a video output terminal of an AV device in computing an optimal connection configuration in step S140 of FIG. 4A. To compute the optimal connection configuration, the optimal connection configuration should be done for each of four cases of the input and output of the video signal and the input and output of the audio signal.

First, it is a process of mapping the video input terminal of the TV to the video output terminal of the AV device. For the video, component video, S-VHS video, and external input video have better image qualities in this sequence. In other words, a first ranked signal is the component video, the second is the S-VHS, and the third is the external input video.

Each of the steps will be discussed with reference to FIG. 8. First, the number and type of component input terminals of the TV are inquired (S801). Next, an AV device having component output terminals among AV devices connected to the network is searched for (S802). If AV devices meeting the condition are found (S803) and the number of found AV devices is larger than the number of the component input terminals of the TV (Yes in step S804), this fact is displayed to the user and a user's selection is input (S806). If the number of found AV devices is smaller than the number of the component input terminals of the TV (No of S804), the component output terminals of the relevant AV device are mapped to the relevant component input terminals of the TV in sequence (S805). The mapping refers to form pairs in a one-to-one fashion between a terminal and a terminal in a table form. Connection situation of the mapped AV device is stored (S807). If an AV device has not been found in step S803, it proceeds to a process of inquiring a subsequent lower terminal.

The number and type of S-video input terminals of the TV is inquired (S801). Next, AV devices having S-video output terminals among other AV devices connected to the network are all searched for (S802). If AV devices meeting the condition are found (S803) and the number of found AV devices is larger than the number of the S-video input terminals of the TV (Yes in step S804), it is displayed to the user and a user's selection is input (S806). If the number smaller than the number of the S-video input terminals of the TV is found (No of S804), the S-video output terminals of the relevant AV device are mapped to the relevant S-video input terminals in sequence (S805). The connection situation of the mapped AV device is stored (S807). If the AV device is not found in step S803, which means that there is no AV device having S-video output, it proceeds to a process of inquiring a subsequent lower terminal.

The number and type of external input terminals of the TV is inquired (S801). Next, AV devices having external output terminals among other AV devices connected to the network are all searched for. If AV devices meeting the condition are found (S803) and the number of found AV devices is larger than the number of the external input terminals of the TV (Yes in step S804), it is displayed to the user and a user's selection is input (S806). If the number of found AV devices is smaller than the number of the external input terminals of the TV (No in step S804), the external output terminals of the relevant AV device are mapped to the relevant external input terminals in sequence (S805). The connection situation of the mapped AV device is stored (S807). If an AV device is not found in step S803, which means that there is no AV device capable of outputting video, the process is ended.

Second, it is a process of mapping video output terminals of the TV to video input terminals of an AV device. In this case, it also suffices to use the same method as the inputting case.

The number and type of component output terminals of the TV is inquired. Next, AV devices having component input terminals among other AV devices connected to the network are all searched for. If AV devices meeting the condition are found and the number of found AV devices is larger than the number of component output terminals of the TV, it is displayed to the user and a selection is input. If the number of found AV devices is smaller than the number of the component output terminals of the TV, component input terminals of the relevant AV device are mapped to relevant component output terminals in sequence. Connection situation of the mapped AV device is stored.

The process is repeated for S-video when an AV device has not been found.

When any AV device having S-video input terminals has not been found in the repeated process, the process is also repeated for external video output.

Third, it is a process of mapping audio input terminals of the TV and audio output terminals of an AV device. For sound quality, a first ranked audio is digital audio, and a second ranked audio is analog audio. At this time, it suffices to use the same process used for video input.

Fourth, it is a process of mapping audio output terminals of the TV and audio input terminals of the AV device. It suffices to use the same process as when a video is output from the TV in the sequence of digital audio followed by analog audio.

Figure 9A:
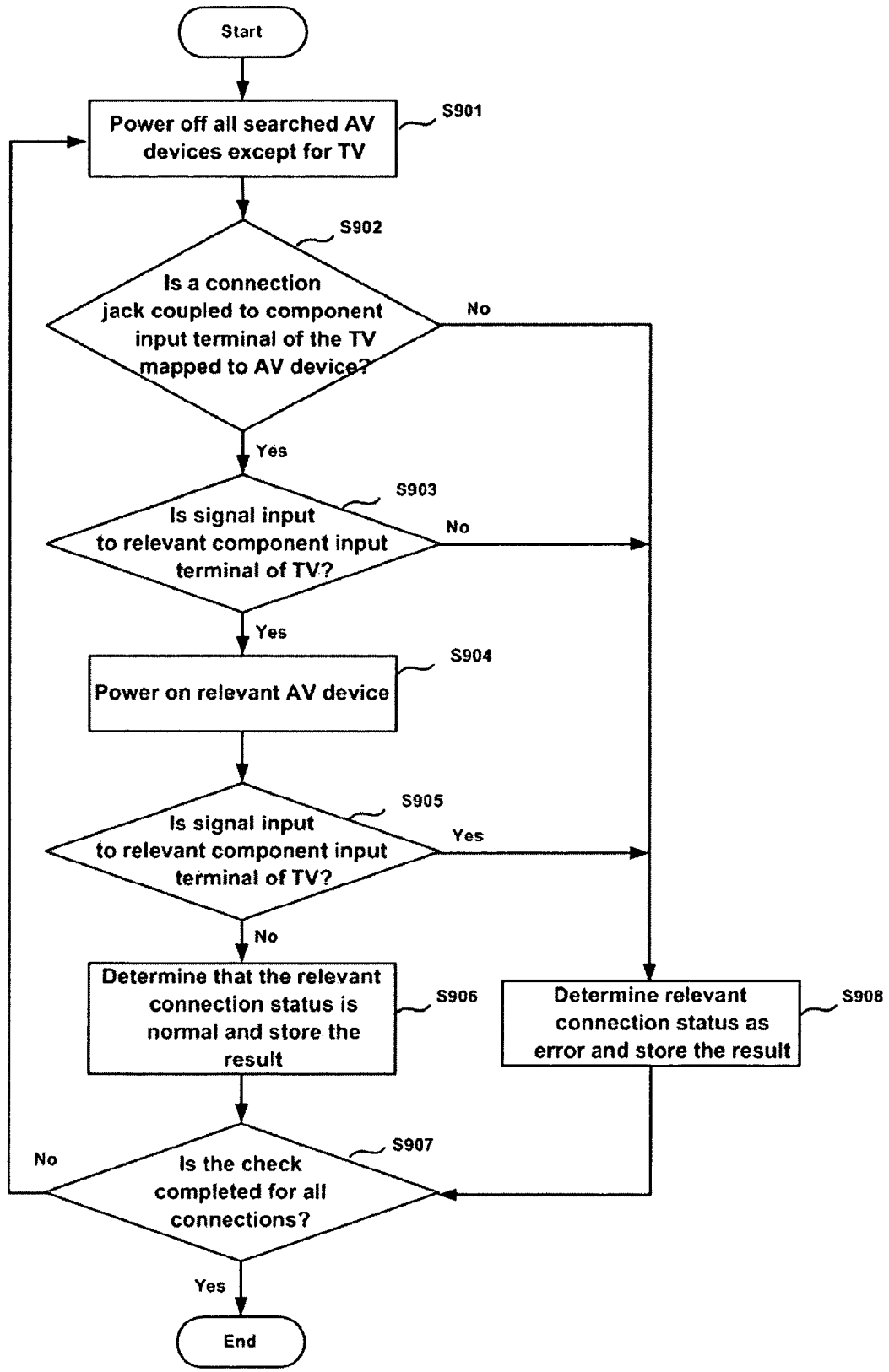
FIG. 9A is a flowchart specifically explaining the process of checking a component video input signal in checking whether connection configuration is normal in steps S150 to S170 of FIG. 4A.

FIG. 9A is a flowchart specifically explaining the process of checking a component video input signal in checking whether connection configuration is normal, namely, in recognizing the connection status of AV cables in steps from S150 to S170 of FIG. 4A.

First, it is checked whether the video input signal or audio input signal is normal. This process will be specifically discussed.

All searched AV devices except for the TV are first powered off (S901). The AV devices mapped to component input terminals of the TV are first checked. A first AV device among target AV devices is selected as a search AV device and it is checked whether the AV connection cable is coupled to the component input terminals of the TV mapped to a relevant AV device (S902). If the AV connection cable is not coupled, which means non-connection, it is determined to be an error (S908). If the AV connection cable is coupled, it is first ascertained whether any signal is input to the relevant component input terminals of the TV (S903). If the signal is being input, which means that an AV device other than the search AV device is connected, it is determined to be a connection error (S908). Next, only the search AV device is powered on and other remaining AV devices keep all powered off (S904), and it is checked whether a signal is input to the relevant component input terminals of the TV (S905). If the signal is not input, it means that the search AV device is not connected and it is determined to be a connection error (S908). If the signal is normally input in the above step, which means that the search AV device is normally connected, it is determined that the relevant connection status is normal (S906), and the subsequent AV device among the mapped AV devices having component output terminals is selected as the search AV device and then the following steps following the step S901 are repeated.

If all connection checks have been completed for the mapped AV devices having component output terminals, the checks are performed on S-video input terminals, and then on external input terminals.

If the connection check has been completed for all video input signals, the connection check is performed on the digital audio input in the same manner.

If the connection check has been completed for all digital audio inputs, then the connection check is performed on the analog audio input in the same manner, if possible.

Figure 9B:
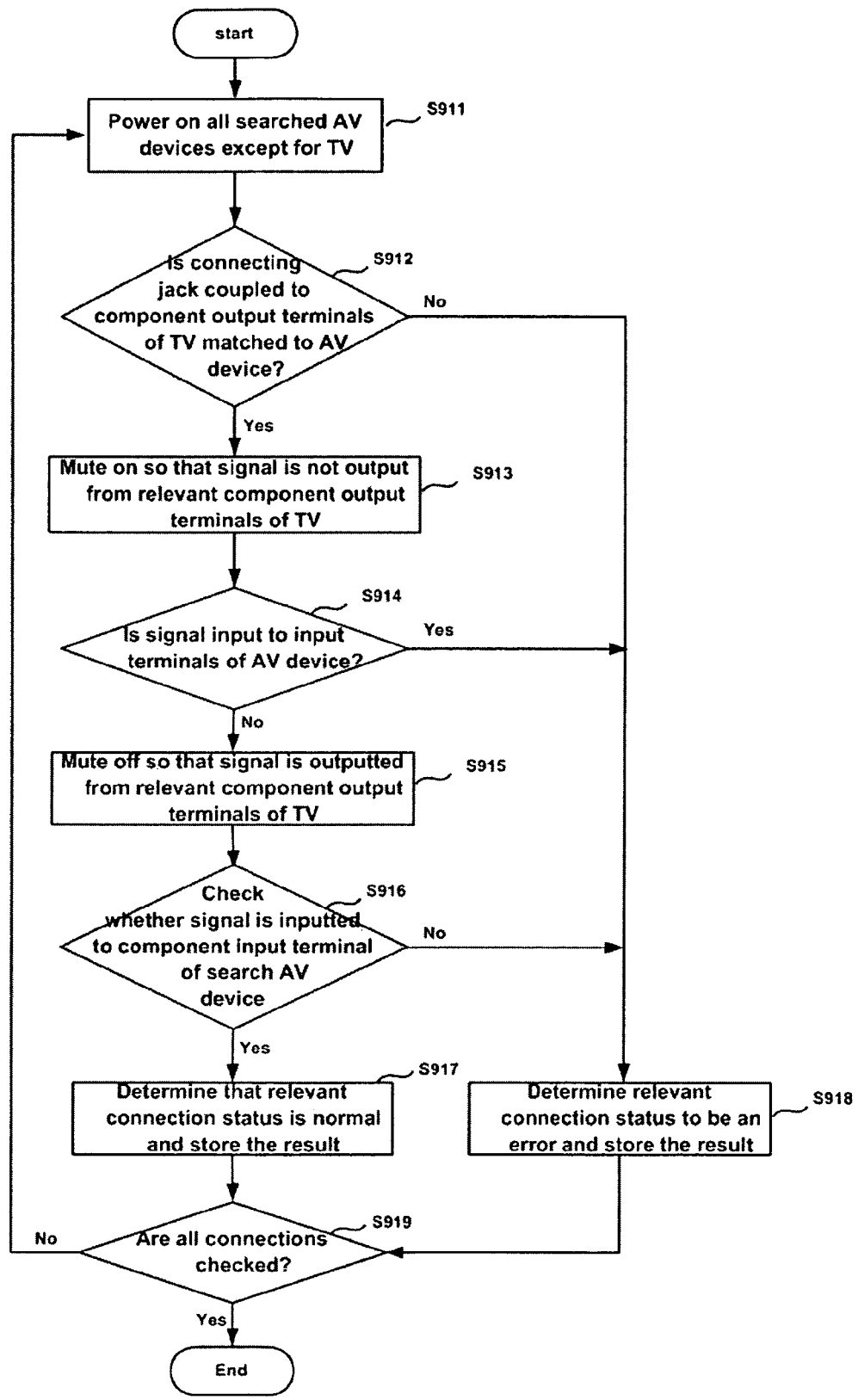
FIG. 9B is a flowchart specifically explaining the process of checking a component video input signal in checking whether connection configuration is normal in steps S150 to S170 of FIG. 4A.

Second, it is checked whether the video or audio output signal is normal. This process will be specifically discussed. FIG. 9B is a flowchart specifically explaining a process of checking a component video input signal in checking whether connection configuration is normal in steps from S150 to S170 of FIG. 4A.

First, the searched AV devices except for the TV are all powered on (S911). Devices for which input signals can be checked among the AV devices mapped to the component output terminals of the TV are checked first. A first AV device among the target AV devices is selected as a search AV device, and it is checked whether an AV cable is coupled to the component output terminals of the TV mapped to the relevant AV device (S912). If the AV cable is not connected, which means that there is no connection, it is determined to be an error (S918). Next, mute is on so that a signal is not output from the relevant component output terminals of the TV (S913), and it is checked whether a signal is input to the component input terminals of the search AV device (S914). If a signal is input, which means that another AV device rather than the search AV device is connected, it is determined to be an error (S918). Next, the mute is off so that a signal is output from the relevant component output terminals of the TV (S915), and it is checked whether a signal is input to the component input terminal of the search AV device (S916). If the signal is not input, which means that the search AV device is not normally connected, it is determined to be an error (S918). If the signal is normally input in the above step, which means that the search AV device is normally connected, it is determined that the relevant connection status is normal (S917). A subsequent AV device among the mapped AV devices having the component input terminals is selected as the search AV device and all steps following the third step are repeated for all of the devices.

If all connection check is completed on the mapped AV devices having the component input terminals, then the check is made on S-video output terminals and thereafter the connection check is performed on the external output terminals.

If the connection check is completed on all video output signals, the connection check is performed on the digital audio output in the same manner. If the connection check has been completed on all digital audio outputs, the connection check is performed on analog audio outputs in the same manner when the check can be made on audio output signals.

FIGS. 10A to 10e explain an internal structure of a packet for transmitting and receiving information between the TV and the AV device. First, FIG. 10A shows an entire structure (each field name) of the transmission/reception packet. The packet may be composed of a header field 1010 containing discriminator information, a source ID field 1020 containing information for identifying a device for transmitting a packet, a destination ID field 1030 containing information for identifying a device for receiving a packet, a message type field 1040 indicating the type of the packet, a body length field 1050 representing the size of the packet body, a packet body field 1060 containing data to be actually transmitted and received, and a checksum field 1070 used to determine whether there is error in the received packet.

Figure 10B:
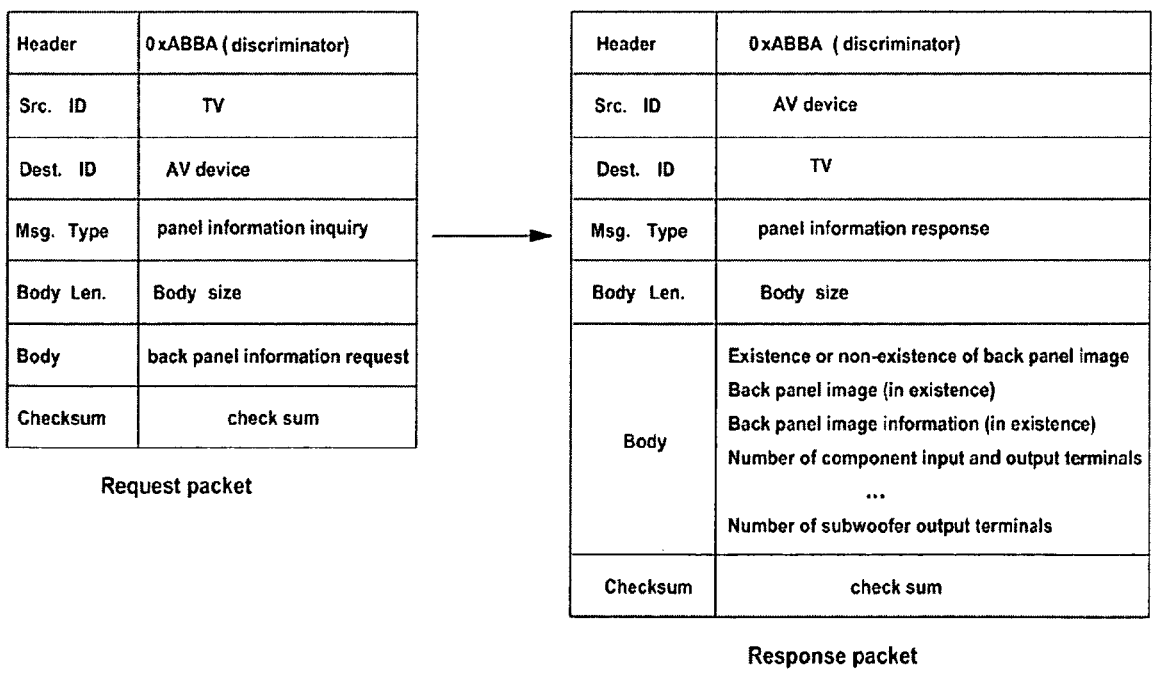
FIG. 10B is a diagram illustrating an example of field names and contents of a packet used in requesting back panel information in step S110 of FIG. 4A and responding back panel information in step S113 of FIG. 4A.

FIG. 10B illustrates an example of field names and contents of a packet used in requesting back panel information in step S110 and responding back panel information in step S113 of FIG. 4A. In the back panel information request packet, the unique identifier of the TV is described in the source ID, and the unique identifier of a receiving AV device is described in the destination ID. In back panel information response packet, they are described in reverse. The back panel information, back panel image, back panel image information and the like as listed in FIG. 7 are described in the body field of the back panel information response packet.

Figure 10C:
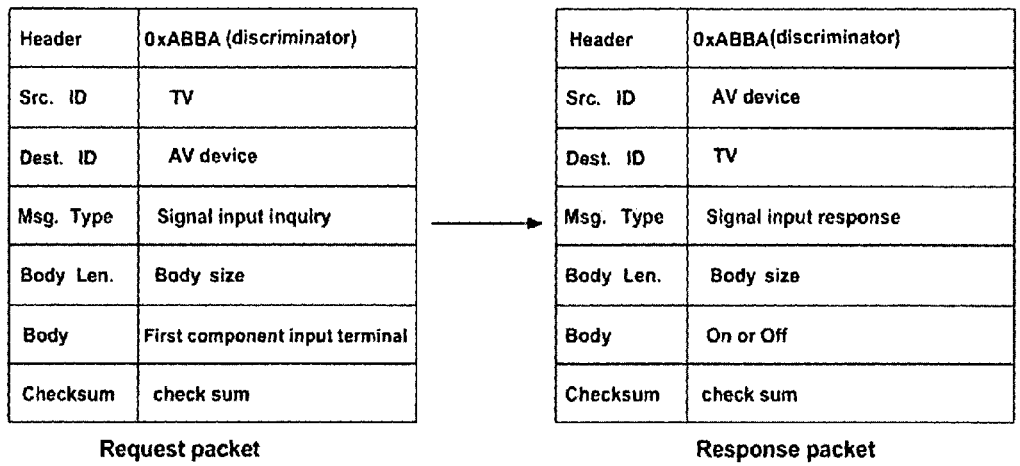
FIG. 10C is a diagram illustrating an example of field names and contents of a transmission/reception packet used in requesting to check a connection signal in step S150 and responding check results in step S151 of FIG. 4A.

FIG. 10C is a diagram illustrating an example of field names and contents of a transmission/reception packet used in requesting to check a connection signal in step S150 and responding check results in step S151 of FIG. 4A. 'Inquiry on whether a signal is input' is described in the message type field of the request packet, and 'input terminal of a first component' is described in the body field. It may be used to recognize the status of the input terminals of the receiving side the first component, namely, when desiring to recognize whether it is on/off. In this regard, the receiving side informs the receiving side of the status of input terminals of the first component as a response by describing on/off in the body field of the response packet.

Figure 10D:
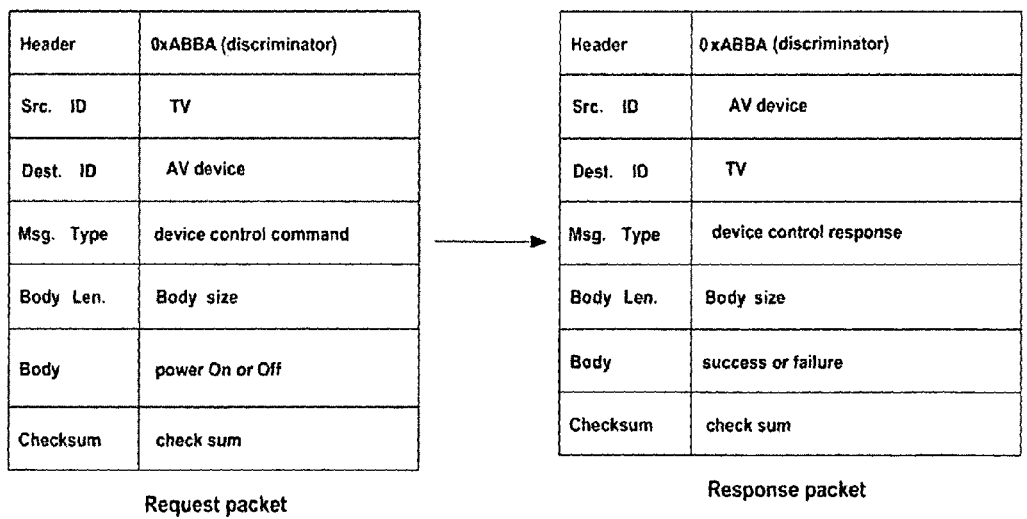
FIG. 10D is a diagram illustrating an example of field names and contents of a transmission/reception packet used when an AV device is powered on and off in FIGS. 9A and 9B.

FIG. 10D illustrates an example of field names and contents of a transmission/reception packet used when powering on or off the AV device in FIGS. 9A and 9B. 'Device control command' is described in a message type field of the request packet, and 'power on or power off' is described in the body field. This packet is a packet used when a TV as a transmitting side controls the power supply for a receiving side AV device. In response to the packet, the receiving side AV device transmits a response packet in which the 'success or failure' of the control command is described in the body field.

According to the present invention, it is possible to reduce efforts for a user to find out an optimal connection way though a user's manual in detail by a video device automatically inquiring back panel information of peripheral devices and obtaining an optimal connection configuration method.

According to the present invention, there is an advantage that user mistakes can be prevented in connecting the devices by visually displaying the derived connection configuration way as a guide on a screen and automatically confirming the connection configuration performed by the user so that the result is notified visually and audibly.

Although the embodiments of the present invention have been described with reference to the accompanying drawings, it will be understood by those skilled in the art that the present invention can be implemented in other specific forms without modifying the technical spirit and essential features of the present invention. Therefore, it should be understood that the illustrated exemplary embodiments are not limitative but only illustrative in all aspects. The scope of the present invention is defined by the appended claims rather than the detailed description, and it should be construed that all modifications or variations derived from the meanings and scope of the claims and its equivalents are included in the scope of the present invention.

What is claimed is:

1. A method for identifying predetermined peripheral devices connected to a video device over serial communication control lines, wherein the video device and the predetermined peripheral devices are connected to one another in a daisy-chain scheme, comprising:
   (a) transmitting a command to disconnect a connection between the predetermined peripheral devices and their lower peripheral device to the predetermined peripheral devices;
   (b) requesting unique device identification information from the predetermined peripheral devices;
   (c) receiving a response to the request from a current peripheral device having no given device ID;
   (d) producing and giving a device ID to the current peripheral device;
   (e) transmitting a command to establish a connection between the current peripheral device having the given device ID and its lower peripheral device; and
   (f) repeating steps (b) through (e) until a device ID is allocated to all the predetermined peripheral devices.

2. The method as claimed in claim 1, wherein establishing the connection between the current peripheral device and its lower peripheral device is performed by enabling a buffer of the current peripheral device, and disconnecting the connection between the predetermined peripheral devices and their lower peripheral device is performed by disabling buffers of the predetermined peripheral devices.

3. A method for allowing a predetermined peripheral device connected to a video device over a serial communication control line to be identified by the video device, wherein the predetermined peripheral device is connected to the video device in a daisy-chain scheme, comprising:
   (a) disconnecting a connection of the predetermined peripheral device to a lower peripheral device;
   (b) receiving, by the predetermined peripheral device, a command to request unique device identification information from the video device over the communication control line;
   (c) transmitting, by the predetermined device, a response to the request command to the video device if a device ID is not allocated to the predetermined peripheral device;
   (d) receiving, by the predetermined device, an allocated device ID from the video device; and
   (e) establishing a connection of the predetermined peripheral device to the lower peripheral device.

4. The method as claimed in claim 3, wherein establishing the connection to the lower peripheral device is performed by enabling a buffer of the predetermined peripheral device, and disconnecting the connection to the lower peripheral device is performed by disabling the buffer of the predetermined peripheral device.

5. A video device for identifying peripheral devices connected to a video device over a communication control line, wherein the video device and the peripheral devices are connected to one another in a daisy-chain scheme, comprising:

a packet transceiver unit for transmitting a signal to request unique device identification information from a first peripheral device of the peripheral devices, receiving a response signal to the signal, and transmitting connection establishing and disconnecting signals to and from the first peripheral device;

a packet generating unit for producing the request signal in a form having a predetermined protocol; and an ID generating unit producing and giving a unique device ID to the first peripheral device;

wherein the produced unique device ID is transmitted to the first peripheral device.

6. The device as claimed in claim 5, wherein if the communication control line is configured in a serial communication scheme, the packet generating unit produces a packet containing a command to disconnect terminals connected between the peripheral devices and a packet containing a command to connect the connected terminals.

7. A peripheral device for allowing the peripheral device connected to a video device over a communication control line to be identified by the video device, wherein the peripheral device is connected to the video device in a daisy-chain scheme, comprising:

a packet transceiver unit for receiving from the video device a packet to request unique device identification information from the peripheral device, and transmitting a response packet to the requesting packet if a device ID is not allocated to the peripheral device;

a packet generating unit for producing the response packet in a form having a predetermined protocol; and a memory unit for storing a device ID that is allocated by the video device in response to transmitting the response packet.

8. The peripheral device as claimed in claim 7, wherein if the communication control line is configured in a serial communication scheme, the peripheral device further comprises:

a buffer for determining whether the video device or an upper peripheral device of the peripheral device is connected to a lower peripheral device of the peripheral device; and a buffer control unit for disconnecting or connecting the buffer according to the command received from the video device.

* * * * *